(12) United States Patent
Wang et al.

(10) Patent No.: US 11,017,715 B2
(45) Date of Patent: May 25, 2021

(54) MURA COMPENSATION METHOD AND DEVICE FOR CURVED SCREEN

(71) Applicant: Wuhan China Star Optoelectronics Semiconductor Display Technology Co., Ltd., Wuhan (CN)

(72) Inventors: Wei Wang, Wuhan (CN); Yaojen Chang, Wuhan (CN)

(73) Assignee: Wuhan China Star Optoelectronics Semiconductor Dispiay Technology Co., Ltd., Wuhan (CN)

(*) Notice: Subject to any disclaimer, the term of this patent is extended or adjusted under 35 U.S.C. 154(b) by 154 days.

(21) Appl. No.: 16/490,896

(22) PCT Filed: Nov. 16, 2018

(86) PCT No.: PCT/CN2018/115833
§ 371 (c)(1),
(2) Date: Sep. 4, 2019

(87) PCT Pub. No.: WO2020/024479
PCT Pub. Date: Feb. 6, 2020

(65) Prior Publication Data
US 2020/0193898 A1    Jun. 18, 2020

(30) Foreign Application Priority Data

Jul. 30, 2018    (CN) .......................... 201810853431.0

(51) Int. Cl.
*G09G 3/3208*        (2016.01)

(52) U.S. Cl.
CPC .... *G09G 3/3208* (2013.01); *G09G 2320/0233* (2013.01); *G09G 2320/0673* (2013.01)

(58) Field of Classification Search
None
See application file for complete search history.

(56) References Cited

U.S. PATENT DOCUMENTS

| 2008/0284794 A1* | 11/2008 | Wang | G09G 3/3688 |
| | | | 345/618 |
| 2017/0206859 A1* | 7/2017 | Jun | G09G 5/10 |
| 2018/0040295 A1* | 2/2018 | Deng | G09G 5/10 |

* cited by examiner

*Primary Examiner* — Krishna P Neupane (57) ABSTRACT

A Mura compensation method and device for a curved screen are disclosed. The method includes: dividing each of curved portions into blocks; acquiring measured luminance values of each of the illuminated sub-pixels in a non-curved portion and measured luminance values of each of the illuminated blocks in the curved portions according to grayscale values, wherein each of measured luminance values has a corresponding relationship with one of the grayscale values; and using the measured luminance values and the grayscale values in a gamma relational expression, solving for coefficients and a gamma value in the gamma relational expression by a fitting process, finding a theoretical luminance value corresponding to each of the grayscale values in a gamma curve according to the gamma value, and using the theoretical luminance value, the coefficients, and the gamma value in the gamma relational expression to solve for a compensation grayscale value.

13 Claims, 4 Drawing Sheets

MURA COMPENSATION METHOD AND DEVICE FOR CURVED SCREEN

RELATED APPLICATIONS

This application is a National Phase of PCT Patent Application No. PCT/CN2018/115833 having International filing date of Nov. 16, 2018, which claims the benefit of priority of Chinese Patent Application No. 201810853431.0 filed on Jul. 30, 2018. The contents of the above applications are all incorporated by reference as if fully set forth herein in their entirety.

FIELD AND BACKGROUND OF THE INVENTION

The present disclosure relates to the field of displays, and specifically to a Mura compensation method and device for a curved screen.

Organic light emitting diode (OLED) screens, having self-illuminating characteristics, belong to current-type light-emitting devices and are used increasingly in high-performance displays. Compared with liquid crystal display (LCD) screens, active matrix organic light emitting diode (AMOLED) screens have many advantages, such as high contrast, ultra-thin, and being flexible. In addition, OLED curved screens are used widely as displays of mobile phones.

In practical applications, brightness non-uniformity (i.e., Mura, also referred as brightness speckle or bright spots) and ghost images are still two major problems of the OLED screens. In order to solve the two problems, in addition to an improvement of a manufacturing process, there is compensation technology applied for flat screens.

For the OLED curved screens, since each of the OLED curved screens has a non-curved portion (i.e., a middle plane) and a curved portion (i.e., arc edges on both sides), if the arc edges do not be compensated for Mura, then display effect will be poor. For example, there is a significant difference in brightness between the curved portion and the non-curved portion, so that the arc edges on both sides need to be compensated for Mura. However, due to a curvature of the arc edges on both sides, when brightness distribution information of entire panel is directly acquired by a camera, information for Mura in the arc edges cannot be effectively obtained for compensation.

Therefore, it is necessary to provide a Mura compensation method for a curved screen to solve problems in the prior art.

SUMMARY OF THE INVENTION

An object of the present disclosure is to provide a Mura compensation method for a curved screen to effectively acquire information for Mura in arc edges for compensation.

Another object of the present disclosure is to provide a Mura compensation device for a curved screen to effectively acquire information for Mura in arc edges for compensation.

In order to achieve one of the above objects of the present disclosure, an embodiment of the present disclosure provides a Mura compensation method for a curved screen, wherein the curved screen includes a non-curved portion and a plurality of curved portions arranged around the non-curved portion, each of the non-curved portion and the curved portions includes a plurality of pixels, and each of the pixels includes a plurality of sub-pixels with different light colors, the Mura compensation method may include: dividing each of the curved portions into a plurality of blocks; acquiring, in a response that each of the sub-pixels with the same light color is lit up with a plurality of grayscale values, for a plurality of measured luminance values of each of the illuminated sub-pixels in the non-curved portion and a plurality of measured luminance values of each of the illuminated blocks in the curved portions, wherein each of measured luminance values has a corresponding relationship with one of the grayscale values; and using the plurality of measured luminance values and the grayscale values in a gamma relational expression between luminance and grayscale values according to the corresponding relationship, solving for a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance values, the coefficients, and the gamma value in the gamma relational expression between luminance and grayscale values to solve for a compensation grayscale value.

In an embodiment of the present disclosure, the gamma relational expression between luminance and grayscale values may be defined as $L1=(a*g1^2+b*g1)^\gamma$, wherein $L1$ is a luminance value, $a$ and $b$ are two coefficients, $g1$ is a grayscale value, and $\gamma$ is the gamma value.

In an embodiment of the present disclosure, a curve equation of the gamma curve may be defined as $L2=g2^\gamma$, wherein $L2$ is the theoretical luminance value, $g2$ is a grayscale value between 0 and 255, and $\gamma$ is the gamma value.

In an embodiment of the present disclosure, the sub-pixels may be lit up in four grayscale values between 1 and 255, and values of the four grayscale values may be set to four of the group consisting of 8, 16, 24, 40, 48, 64, 96, 128, 160, 192, 224, 240, and 255.

In an embodiment of the present disclosure, the fitting process may be performed by a least square method; the measured luminance values of each of the illuminated sub-pixels in the non-curved portion and the measured luminance values of each of the illuminated blocks in the curved portions may be acquired by an image capturing element; a number of the curved portions may be two, the two curved portions may be spread on two sides of the non-curved portion; and each of the blocks may have M×N pixels, M may be 4, and N may be 4.

In order to achieve one of the above objects, another embodiment of the present disclosure provides a Mura compensation device for a curved screen, wherein the curved screen includes a non-curved portion and a plurality of curved portions arranged around the non-curved portion, each of the non-curved portion and the curved portions includes a plurality of pixels, and each of the pixels includes a plurality of sub-pixels with different light colors, the Mura compensation device includes: an image capturing element; and a processing unit electrically connected to the image capturing element and a curved screen; wherein the processing unit is configured for dividing each of the curved portions into a plurality of blocks, controlling the image capturing element for acquiring, in a response that each of the sub-pixels with the same light color is illuminated by a plurality of grayscale values, for a plurality of measured luminance values of each of the illuminated sub-pixels in the non-curved portion and a plurality of measured luminance values of each of the illuminated blocks in the curved portions, wherein each of measured luminance values has a corresponding relationship with one of the grayscale values; and the processing unit is configured for using the measured luminance values and the grayscale values into a gamma relational expression between luminance and grayscale values according to the corresponding relationship, solving a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance values, the coefficients, and the gamma value to the gamma relational expression between luminance and grayscale values to solve a compensation gray; and wherein the gamma relational expression between luminance and grayscale values is define as $L1=(a*g1^2+b*g1)^\gamma$, a curve equation of the gamma curve is defined as $L2=g2^\gamma$, L1 is a luminance value, L2 is the theoretical luminance value, a and b are two coefficients, g1 is a grayscale value, g2 is a grayscale value between 0 and 255, and $\gamma$ is the gamma value.

In an embodiment of the present disclosure, the sub-pixels may be lit up in four grayscale values between 1 and 255, and the four grayscale values may be set to four of the group consisting of 8, 16, 24, 40, 48, 64, 96, 128, 160, 192, 224, 240, and 255.

In an embodiment of the present disclosure, the fitting process may be performed by a least square method; a number of the curved portions may be two, the two curved portions may be spread on two sides of the non-curved portion; and each of the blocks may have M×N pixels, M may be 4, and N may be 4.

In order to achieve one of the above objects, another embodiment of the present disclosure provides a Mura compensation device for a curved screen, wherein the curved screen includes a non-curved portion and a plurality of curved portions arranged around the non-curved portion, each of the non-curved portion and the curved portions includes a plurality of pixels, and each of the pixels includes a plurality of sub-pixels with different light colors, the Mura compensation device includes: an image capturing element; and a processing unit electrically connected to the image capturing element and a curved screen; wherein the processing unit is configured for dividing each of the curved portions into a plurality of blocks, controlling the image capturing element for acquiring, in a response that each of the sub-pixels with the same light color is illuminated by a plurality of grayscale values, for a plurality of measured luminance values of each of the illuminated sub-pixels in the non-curved portion and a plurality of measured luminance values of each of the illuminated blocks in the curved portions, wherein each of measured luminance values has a corresponding relationship with one of the grayscale values; and the processing unit is configured for using the measured luminance values and the grayscale values into a gamma relational expression between luminance and grayscale values according to the corresponding relationship, solving a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance value, the coefficients, and the gamma value in the gamma relational expression between luminance and grayscale values to solve a compensation gray.

In an embodiment of the present disclosure, the gamma relational expression between luminance and grayscale values may be defined as $L1=(a*g1^2+b*g1)^\gamma$, wherein L1 is a luminance value, a and b are two coefficients, g1 is a grayscale value, and $\gamma$ is the gamma value.

In an embodiment of the present disclosure, a curve equation of the gamma curve may be defined as $L2=g2^\gamma$, wherein L2 is the theoretical luminance value, g2 is a grayscale value between 0 and 255, and $\gamma$ is the gamma value.

In an embodiment of the present disclosure, the sub-pixels may be lit up in four grayscale values between 1 and 255, and the four grayscale values may be set to four of the group consisting of 8, 16, 24, 40, 48, 64, 96, 128, 160, 192, 224, 240, and 255.

In an embodiment of the present disclosure, the fitting process may be performed by a least square method; a number of the curved portions may be two, the two curved portions may be spread on two sides of the non-curved portion; and each of the blocks may have M×N pixels, M may be 4, and N may be 4.

Compared with the prior art, the Mura compensation method and device for the curved screen of the present disclosure may be configured for dividing the curved portions arranged around the non-curved portion into the plurality of blocks, using the plurality of measured luminance values and the grayscale values in the gamma relational expression between luminance and grayscale values according to the corresponding relationship, solving for the plurality of coefficients and the gamma value in the gamma relational expression between luminance and grayscale values by the fitting process, finding the theoretical luminance value corresponding to each of the grayscale values in the gamma curve according to the gamma value, and using the theoretical luminance values, the coefficients, and the gamma value in the gamma relational expression between luminance and grayscale values to solve for the compensation grayscale value. Therefore, phenomenon of bright spots or brightness non-uniformity of the curved screen may be solved to effectively improve display effect of the curved screen.

DESCRIPTION OF SPECIFIC EMBODIMENTS OF THE INVENTION

Following description of the various embodiments is provided to illustrate the specific embodiments of the present disclosure. Furthermore, directional terms mentioned in the present disclosure, such as upper, lower, top, bottom, front, rear, left, right, inner, outer, side, surrounding, central, horizontal, lateral, vertical, longitudinal, axial, radial, uppermost layer or lowermost layer, only refer to direction of additional drawings. Therefore, the directional terms are only used for illustrating and understanding of the present disclosure, and are not intended to limit the present disclosure.

Figure 1:
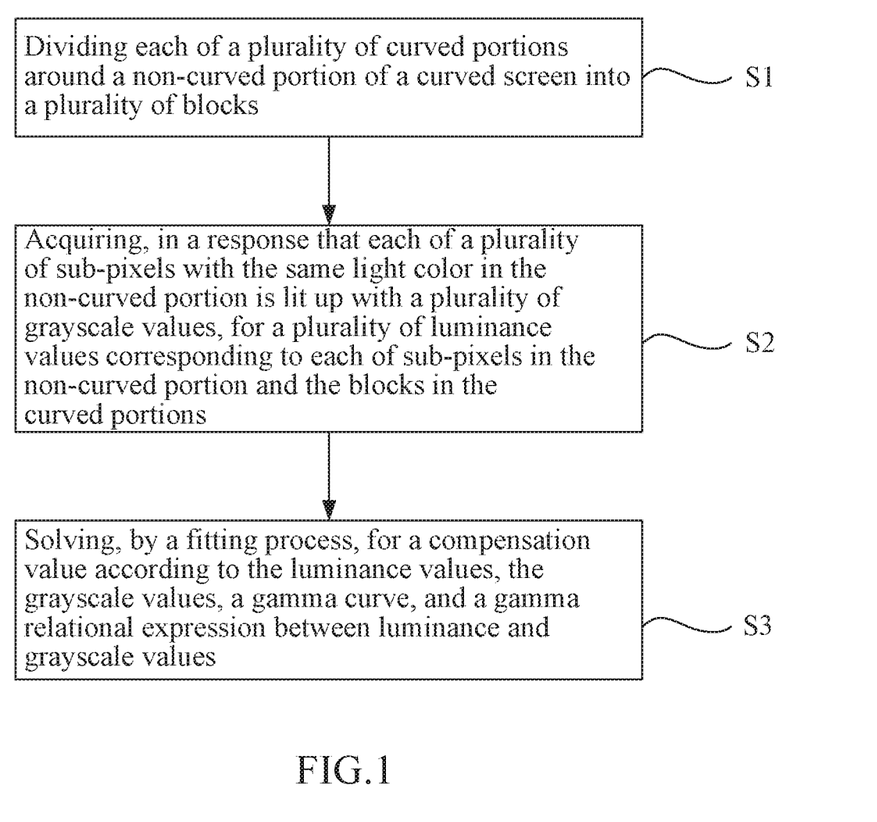
FIG. 1 is a flow chart illustrating a Mura compensation method for a curved screen, according to an embodiment of the present disclosure.
Figure 2:
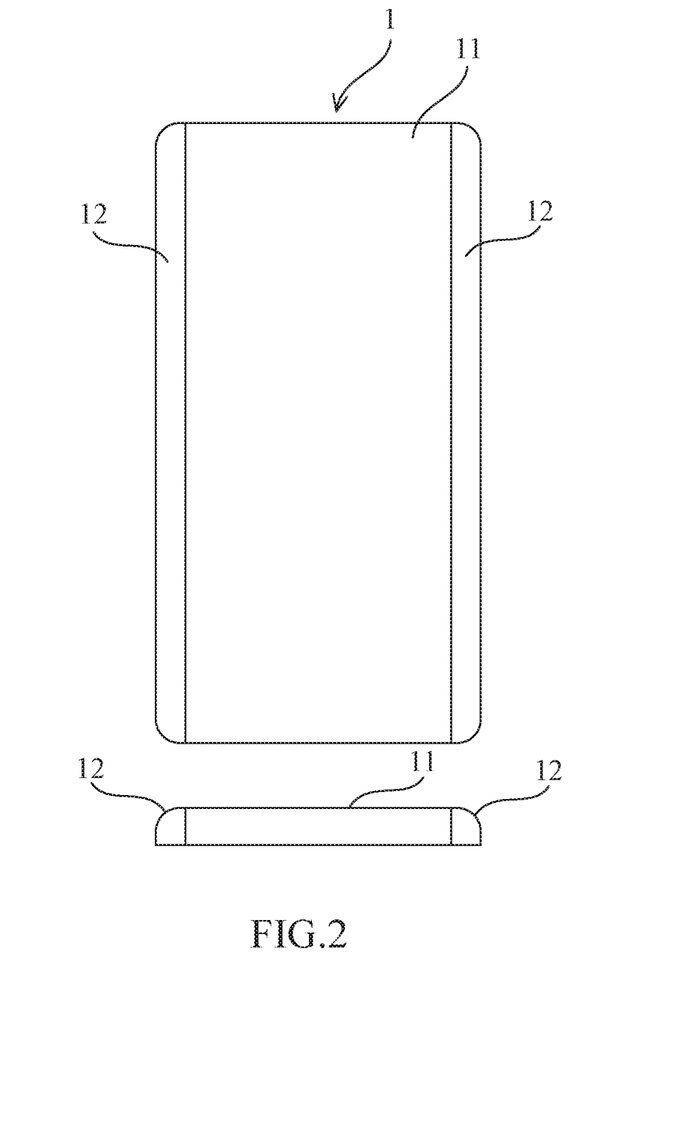
FIG. 2 is a schematic diagram illustrating a top plan view and a cross-sectional view of a non-curved portion and a curved portion of the curved screen, according to an embodiment of the present disclosure.
Figure 3:
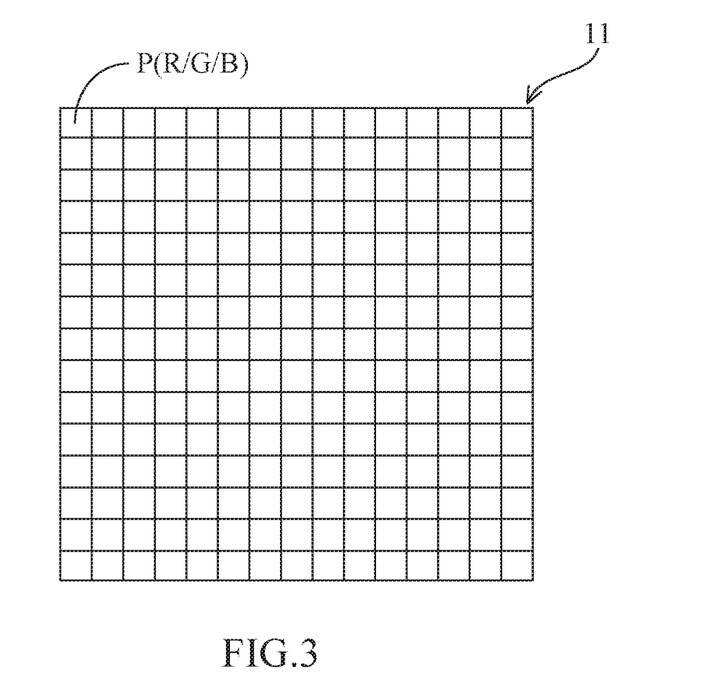
FIG. 3 is a schematic diagram of sub-pixels in the non-curved portion, according to an embodiment of the present disclosure.
Figure 4:
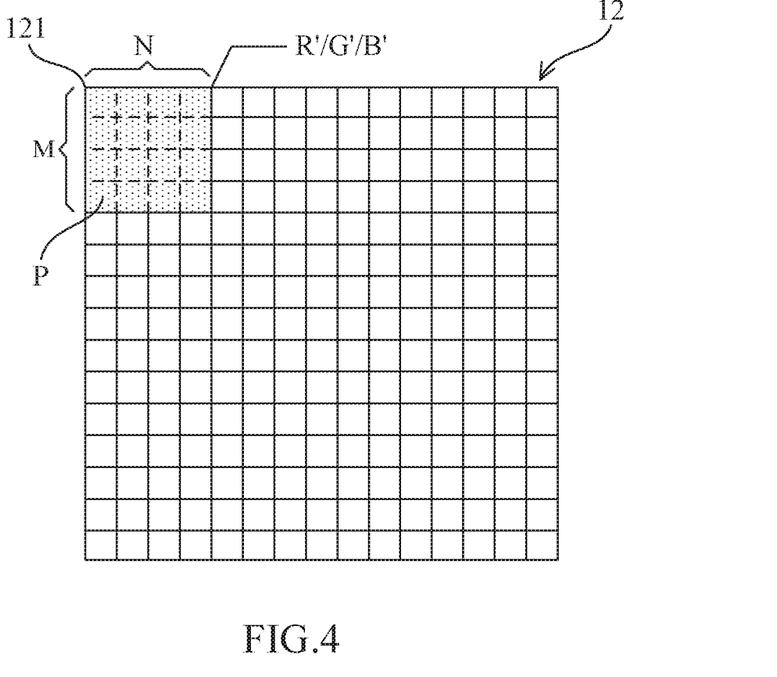
FIG. 4 is a schematic diagram illustrating blocks in the curved portion, according to an embodiment of the present disclosure.

Please refer to FIG. 1, a Mura compensation method for a curved screen according to an embodiment of the present disclosure may include a plurality of steps S1, S2, and S3. As shown in FIGS. 2 to 4, a curved screen 1 may be a flexible display screen, for example, organic light emitting diode (OLED) curved screen (such as active matrix organic light emitting diode (AMOLED) screen) and the like. The curved screen 1 may include a non-curved portion 11 and a plurality of curved portions 12 arranged around the non-curved portion 11. For example, a number of the curved portions 12 may be two, three, or four. Taking two curved portions 12 as an example, the two curved portions 12 may be distributed on two opposite to each other of four side edges of the non-curved portion 11. Each of the non-curved portion 11 and the curved portions 12 may has a plurality of pixels P. Each of pixels P may include a plurality of sub-pixels with different light colors. For example, each of the sub-pixels may be one of red, green, and blue sub-pixels and may be lit up to generate different luminance values according to different grayscale values (related to brightness). Embodiments of the Mura compensation method for the curved screen are exemplified as follows, but are not limited as described here.

As shown in FIGS. 2 to 4, the step S1, which is the step of dividing each of the curved portions 12 into a plurality of blocks 121, each of the blocks 121 has M×N pixels P. For example, M is preferably 4, and N is preferably 4, in order to obtain a good compensation effect, but that are not limited as described here, the M and N may be increased or decreased according to actual requirements.

As shown in FIGS. 3 and 4, the step S2, which is the step of acquiring, in a response that each of the sub-pixels with the same light color is lit up with a plurality of grayscale values, for a plurality of measured luminance values of each of the illuminated sub-pixels in the non-curved portion 11 and a plurality of measured luminance values of each of the illuminated blocks 121 in the curved portions 12, wherein each of measured luminance values has a corresponding relationship with one of the grayscale values.

By way of example, as shown in FIGS. 3 and 4, firstly, a value of each grayscale value may be ranged between 1 and 255(such as 8). The curved screen 1 may be displayed as a pure red picture in one of the grayscale values. After an image is captured by an image capturing element (such as camera) toward the non-curved portion 11 and the curved portion 12, each of luminance information R of each red sub-pixel in the non-curved portion 11 and luminance information R' of each red block 121 in the curved portion 12 is acquired as one of the measured luminance value, wherein one of the measured luminance values (such as R, R') has a correspondence with one of the plurality of grayscale values (such as 8).

Then, as shown in FIGS. 3 and 4, the curved screen 1 can be displayed as a pure green picture in one of the grayscale values. After an image is captured by the image capturing element toward the non-curved portion 11 and the curved portion 12, each of luminance information G of each green sub-pixel in the non-curved portion 11 and luminance information G' of each green block 121 in the curved portion 12 is acquired as one of the measured luminance value, wherein one of the measured luminance values (such as G, G') has a correspondence with one of the plurality of grayscale values (such as 8).

In continue, as shown in FIGS. 3 and 4, the curved screen 1 can be displayed as a pure blue picture in one of the grayscale values. After an image is captured by the image capturing element toward the non-curved portion 11 and the curved portion 12, each of luminance information B of each blue sub-pixel in the non-curved portion 11 and luminance information B' of each green block 121 in the curved portion 12 is acquired as one of the measured luminance value, wherein one of the measured luminance value (such as B, B') has a correspondence with one of the plurality of grayscale values (such as 8).

Subsequently, as shown in FIGS. 3 and 4, the curved screen 1 can be displayed as the pure red, the pure green, and the pure blue pictures in different grayscale values, and the above process is repeated to obtain the luminance information distributed in the curved screen 1 under the other grayscale values.

In an embodiment, the sub-pixels are lit up in four grayscale values, such that excellent compensation effect is achieved, for example, the four grayscale values may be selected into four of the group consisting of 8, 16, 24, 40, 48, 64, 96, 128, 160, 192, 224, 240, and 255, and are not limited as described here.

As shown in FIGS. 3 and 4, the step S3, which is the step of using the plurality of measured luminance values and the grayscale values in a gamma relational expression between luminance and grayscale values according to the corresponding relationship, solving for a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance value, the coefficients, and the gamma value in the gamma relational expression between luminance and grayscale values to solve for a compensation grayscale value.

By way of example, the gamma relational expression between luminance and grayscale values may be defined as $L1=(a*g1^2+b*g1)^\gamma$, wherein L1 is a luminance value, a and b are two coefficients, g1 is a grayscale value, and $\gamma$ is the gamma value, such as 2.2 or 2.5. For each sub-pixel in the non-curved portion 11 or each block 121 in the curved portion 12, each of measured luminance values has a corresponding relationship with one of the grayscale values. For example, if one of the sub-pixels is lit up in four grayscale values, then four corresponding relationships between measured luminance values and grayscale values for the same sub-pixel may be acquired. So that, four measured luminance values and four corresponding grayscale values are used in the gamma relational expression between luminance and grayscale values four times to generate four functions, according to the four corresponding relationships. Then, a fitting process may be performed, such as least square method for fitting, in order to quickly obtain an optimal solution after fitting the four functions to solve the coefficients a, b, and the gamma value $\gamma$ in the gamma relational expression between luminance and grayscale values.

In addition, a curve equation of the gamma curve is defined as $L2=g2^\gamma$, wherein L2 is the theoretical luminance value, g2 is a grayscale value between 0 and 255, and $\gamma$ is the gamma value. For example, the gamma curve may be a curve shown in FIG. 5, but is not limited as described here. Thus, the value L2 of the theoretical luminance value corresponding to each grayscale value served as the g2 can be found in the gamma curve, according to the solved gamma value γ.

Figure 5:
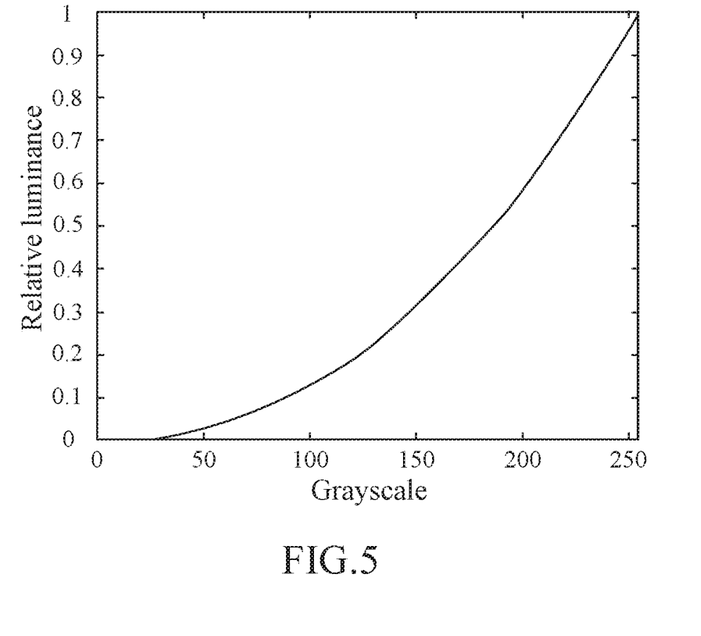
FIG. 5 is a schematic diagram illustrating a gamma curve, according to an embodiment of the present disclosure.
Figure 6:
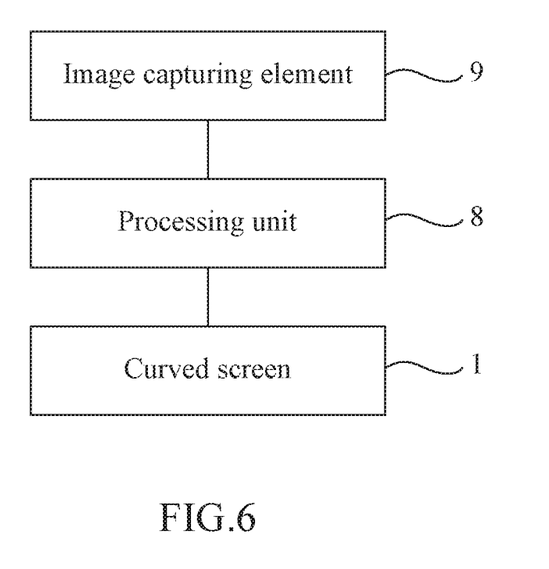
FIG. 6 is a schematic block diagram illustrating a Mura compensation device for a curved screen, according to an embodiment of the present disclosure.

Furthermore, the value L2 of the theoretical luminance value may be set to the luminance value L1 in the gamma relational expression between luminance and grayscale values, and the value L2 of the theoretical luminance value, the coefficients a, b, and the gamma value γ may be used again in the gamma relational expression between luminance and grayscale values, then the g1 may be solved as a compensation grayscale value, which is served as a compensation value for each of the sub-pixels in the non-curved portion or each of the blocks in the curved portion, in order to reduce the human eye's perception for brightness unevenness.

In addition, The Mura compensation method for the curved screen according to the above embodiments of the present disclosure can be automatically performed by a Mura compensation device for a curved screen, so as to improve execution efficiency and reduce manual operation cost.

By way of example, as shown in FIGS. 2 to 4 and 6, the Mura compensation device for the curved screen may include an image capturing element 9 and a processing unit 8. The image capturing element 9 may be mounted on a three-dimensional motion platform for obtaining images with luminance information toward different positions of the curved screen 1. The processing unit 8 is electrically connected to the image capturing element 9 and the above curved screen 1. The processing unit 8 may be configured for dividing each of the curved portions 12 into a plurality of blocks 121, controlling the image capturing element 9 for acquiring, in a response that each of the sub-pixels with the same light color is illuminated by a plurality of grayscale values, for a plurality of measured luminance values of each of the illuminated sub-pixels in the non-curved portion 11 and a plurality of measured luminance values of each of the illuminated blocks 121 in the curved portions 12, wherein each of measured luminance values has a corresponding relationship with one of the grayscale values; and the processing unit 8 is configured for using the measured luminance values and the grayscale values into a gamma relational expression between luminance and grayscale values according to the corresponding relationship, solving a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance value, the coefficients, and the gamma value in the gamma relational expression between luminance and grayscale values to solve a compensation gray.

The features of the Mura compensation method for the curved screen of the above embodiment of the present disclosure may be also applicable to embodiments of the Mura compensation device for the curved screen, as exemplified below.

In an embodiment of the present disclosure, the gamma relational expression between luminance and grayscale values may be defined as $L1=(a*g1^2+b*g1)^\gamma$, wherein L1 is a luminance value, a and b are two coefficients, g1 is a grayscale value, and γ is the gamma value.

In an embodiment of the present disclosure, a curve equation of the gamma curve may be defined as $L2=g2^\gamma$, wherein L2 is the theoretical luminance value, g2 is a grayscale value between 0 and 255, and γ is the gamma value.

In an embodiment of the present disclosure, the sub-pixels may be lit up in four grayscale values between 1 and 255, and the four grayscale values may be set to four of the group consisting of 8, 16, 24, 40, 48, 64, 96, 128, 160, 192, 224, 240, and 255.

In an embodiment of the present disclosure, the fitting process may be performed by a least square method; a number of the curved portions may be two, the two curved portions may be spread on two sides of the non-curved portion; and each of the blocks may have M×N pixels, M may be 4, and N may be 4.

As described above, the above embodiments of the present disclosure are mainly achieved by dividing the curved portions arranged around the non-curved portion into the plurality of blocks, using the plurality of measured luminance values and the grayscale values in the gamma relational expression between luminance and grayscale values according to the corresponding relationship, solving for the plurality of coefficients and the gamma value in the gamma relational expression between luminance and grayscale values by the fitting process, finding the theoretical luminance value corresponding to each of the grayscale values in the gamma curve according to the gamma value, and using the theoretical luminance value, the coefficients, and the gamma value in the gamma relational expression between luminance and grayscale values to solve for the compensation grayscale value.

Therefore, for a problem of bright spots or brightness non-uniformity (Mura) to the curved screen, the disclosed embodiments can process and correct data for Mura, after completing a collection of luminance distribution information in the entire curved screen. It is used to perform a compensation for Mura to solve phenomenon of bright spots or brightness non-uniformity of the screen, thereby effectively improving display effect of the curved screen.

The present disclosure has been described by the above related embodiments, but the above embodiments are merely examples for implementing the present disclosure. It must be noted that, the disclosed embodiments do not limit the scope of the present disclosure. Rather, the scope of the present disclosure includes modifications and equivalent arrangements involved in spirit and scope of claims.

What is claimed is:

1. A Mura compensation method for a curved screen, wherein the curved screen comprises a non-curved portion and a plurality of curved portions arranged around the non-curved portion, each of the non-curved portion and the curved portions comprises a plurality of pixels, and each of the pixels comprises a plurality of sub-pixels with different light colors, the Mura compensation method comprising:
   dividing each of the curved portions into a plurality of blocks;
   acquiring, in response that each of the sub-pixels with the same light color is lit up with a plurality of grayscale values, for a plurality of measured luminance values of each of the illuminated sub-pixels in the non-curved portion and a plurality of measured luminance values of each of the illuminated blocks in the curved portions, wherein each of measured luminance values has a corresponding relationship with one of the grayscale values; and
   using the plurality of measured luminance values and the grayscale values in a gamma relational expression between luminance and grayscale values according to the corresponding relationship, solving for a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance value, the coefficients, and the gamma value in the gamma relational expression between luminance and grayscale values to solve for a compensation grayscale value.

2. The Mura compensation method for the curved screen as claimed in claim 1, wherein the gamma relational expression between luminance and grayscale values is defined as $L1=(a*g1^2+b*g1)^\gamma$, wherein L1 is a luminance value, a and b are two coefficients, g1 is a grayscale value, and $\gamma$ is the gamma value.

3. The Mura compensation method for the curved screen as claimed in claim 1, wherein a curve equation of the gamma curve is defined as $L2=g2^\gamma$, wherein L2 is the theoretical luminance value, g2 is a grayscale value between 0 and 255, and $\gamma$ is the gamma value.

4. The Mura compensation method for the curved screen as claimed in claim 1, wherein the sub-pixels are lit up in four grayscale values between 1 and 255, and the four grayscale values are set to four of the group consisting of 8, 16, 24, 40, 48, 64, 96, 128, 160, 192, 224, 240, and 255.

5. The Mura compensation method for the curved screen as claimed in claim 1, wherein the fitting process is performed by a least square method; the measured luminance values of each of the illuminated sub-pixels in the non-curved portion and the measured luminance values of each of the illuminated blocks in the curved portions are acquired by an image capturing element; a number of the curved portions is two, the two curved portions are spread on two sides of the non-curved portion; and each of the blocks has M×N pixels, M is 4, and N is 4.

6. A Mura compensation device for a curved screen, wherein the curved screen comprises a non-curved portion and a plurality of curved portions arranged around the non-curved portion, each of the non-curved portion and the curved portions comprises a plurality of pixels, and each of the pixels comprises a plurality of sub-pixels with different light colors, the Mura compensation device comprising:
an image capturing element; and
a processing unit electrically connected to the image capturing element and a curved screen;
wherein the processing unit is configured for dividing each of the curved portions into a plurality of blocks, controlling the image capturing element for acquiring, in a response that each of the sub-pixels with the same light color is illuminated by a plurality of grayscale values, for a plurality of measured luminance values of each of the illuminated sub-pixels in the non-curved portion and a plurality of measured luminance values of each of the illuminated blocks in the curved portions, wherein each of measured luminance values has a corresponding relationship with one of the grayscale values; and the processing unit is configured for using the measured luminance values and the grayscale values into a gamma relational expression between luminance and grayscale values according to the corresponding relationship, solving a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance value, the coefficients, and the gamma value in the gamma relational expression between luminance and grayscale values to solve a compensation gray; and wherein the gamma relational expression between luminance and grayscale values is define as $L1=(a*g1^2+b*g1)^\gamma$, a curve equation of the gamma curve is defined as $L2=g2^\gamma$, L1 is a luminance value, L2 is the theoretical luminance value, a and b are two coefficients, g1 is a grayscale value, g2 is a grayscale value between 0 and 255, and $\gamma$ is the gamma value.

7. The Mura compensation device for the curved screen as claimed in claim 6, wherein the sub-pixels are lit up in four grayscale values between 1 and 255, and the four grayscale values are set to four of the group consisting of 8, 16, 24, 40, 48, 64, 96, 128, 160, 192, 224, 240, and 255.

8. The Mura compensation device for the curved screen as claimed in claim 6, wherein the fitting process is performed by a least square method; a number of the curved portions is two, the two curved portions are spread on two sides of the non-curved portion; and each of the blocks has M×N pixels, M is 4, and N is 4.

9. A Mura compensation device for a curved screen, wherein the curved screen comprises a non-curved portion and a plurality of curved portions arranged around the non-curved portion, each of the non-curved portion and the curved portions comprises a plurality of pixels, and each of the pixels comprises a plurality of sub-pixels with different light colors, the Mura compensation device comprising:
an image capturing element; and
a processing unit electrically connected to the image capturing element and a curved screen;
wherein the processing unit is configured for dividing each of the curved portions into a plurality of blocks, controlling the image capturing element for acquiring, in a response that each of the sub-pixels with the same light color is illuminated by a plurality of grayscale values, for a plurality of measured luminance values of each of the illuminated sub-pixels in the non-curved portion and a plurality of measured luminance values of each of the illuminated blocks in the curved portions, wherein each of measured luminance values has a corresponding relationship with one of the grayscale values; and the processing unit is configured for using the measured luminance values and the grayscale values into a gamma relational expression between luminance and grayscale values according to the corresponding relationship, solving a plurality of coefficients and a gamma value in the gamma relational expression between luminance and grayscale values by a fitting process, finding a theoretical luminance value corresponding to each of the grayscale values in a gamma curve according to the gamma value, and using the theoretical luminance values, the coefficients, and the gamma value to the gamma relational expression between luminance and grayscale values to solve a compensation gray.

10. The Mura compensation device for the curved screen as claimed in claim 9, wherein the gamma relational expression between luminance and grayscale values is defined as $L1=(a*g1^2+b*g1)^\gamma$, wherein L1 is a luminance value, a and b are two coefficients, g1 is a grayscale value, and $\gamma$ is the gamma value.

11. The Mura compensation device for the curved screen as claimed in claim 9, wherein a curve equation of the gamma curve is defined as $L2=g2^\gamma$, wherein L2 is the theoretical luminance value, g2 is a grayscale value between 0 and 255, and $\gamma$ is the gamma value.

12. The Mura compensation device for the curved screen as claimed in claim 9, wherein the sub-pixels are lit up in four grayscale values between 1 and 255, and the four grayscale values are set to four of the group consisting of 8, 16, 24, 40, 48, 64, 96, 128, 160, 192, 224, 240, and 255.

13. The Mura compensation device for the curved screen as claimed in claim 9, wherein the fitting process is performed by a least square method; a number of the curved portions is two, the two curved portions are spread on two sides of the non-curved portion; and each of the blocks has M×N pixels, M is 4, and N is 4.

* * * * *